United States Patent [19]

Hale et al.

[11] Patent Number: 5,085,282
[45] Date of Patent: Feb. 4, 1992

[54] METHOD FOR DRILLING A WELL WITH EMULSION DRILLING FLUIDS

[75] Inventors: Arthur H. Hale; George C. Blytas, both of Houston, Tex.

[73] Assignee: Shell Oil Company, Houston, Tex.

[21] Appl. No.: 671,628

[22] Filed: Mar. 19, 1991

Related U.S. Application Data

[60] Continuation-in-part of Ser. No. 503,496, Mar. 30, 1990, abandoned, which is a continuation-in-part of Ser. No. 377,740, Jul. 17, 1989, abandoned, which is a division of Ser. No. 167,968, Mar. 14, 1988, abandoned, and a continuation-in-part of Ser. No. 373,606, Jun. 30, 1989, abandoned, which is a division of Ser. No. 167,660, Mar. 14, 1988, abandoned, and a continuation-in-part of Ser. No. 353,195, May 12, 1989, abandoned, which is a division of Ser. No. 167,769, Mar. 14, 1988, abandoned.

[51] Int. Cl.$^5$ .................. E21B 21/00; E21B 49/00
[52] U.S. Cl. ............................. 175/40; 175/50; 175/65
[58] Field of Search ............... 175/40, 50, 65, 66; 73/153; 252/8.51, 8.511, 8.513, 8.514

[56] References Cited

U.S. PATENT DOCUMENTS

| | | | |
|---|---|---|---|
| 2,423,144 | 7/1947 | Gregg | 252/8.511 X |
| 2,573,960 | 11/1951 | Fischer | 252/8.515 |
| 2,697,692 | 12/1954 | Salathiel | 252/8.515 |
| 3,301,323 | 1/1967 | Parsons | 175/24 X |
| 3,310,125 | 3/1967 | Darley | 175/66 |
| 3,639,233 | 2/1972 | Schultz et al. | 252/8.515 X |
| 4,053,422 | 10/1977 | Walker | 252/8.51 |
| 4,508,628 | 4/1985 | Walker et al. | 252/8.515 |
| 4,780,220 | 10/1988 | Peterson | 252/8.51 X |
| 4,802,998 | 2/1989 | Mueller et al. | 252/8.514 |

FOREIGN PATENT DOCUMENTS

| | | |
|---|---|---|
| 324887A | 1/1988 | European Pat. Off. |
| 374671A | 12/1988 | European Pat. Off. |
| 382070A | 2/1989 | European Pat. Off. |
| 382071A | 2/1989 | European Pat. Off. |
| 386636A | 3/1989 | European Pat. Off. |
| 386638A | 3/1989 | European Pat. Off. |
| 391251A | 4/1989 | European Pat. Off. |
| 391252A | 4/1989 | European Pat. Off. |
| 398112A | 5/1989 | European Pat. Off. |
| 398113A | 5/1989 | European Pat. Off. |
| 399270A1 | 5/1989 | European Pat. Off. |
| 374672A | 12/1989 | European Pat. Off. |
| 2216573A | 10/1989 | United Kingdom |
| 2216574A | 10/1989 | United Kingdom |
| 2223255A | 4/1990 | United Kingdom |

*Primary Examiner*—George A. Suchfield

[57] ABSTRACT

Oil in water emulsion drilling fluid properties are enhanced by incorporation thereinto of an alcohol such as glycerol or polycyclicpolyetherpolyol and salt.

8 Claims, 1 Drawing Sheet

FRICTIONAL COEFFICIENTS FOR GLYCEROL AND GLYCEROL/OIL EMULSION

- □ CONTROL 0.45
- △ 10% (GLYCEROL/OIL/SURFACTANT)
- × 20% GLYCEROL
- ○ 10% GLYCEROL
- ▽ 20% (GLYCEROL/OIL/SURFACTANT)

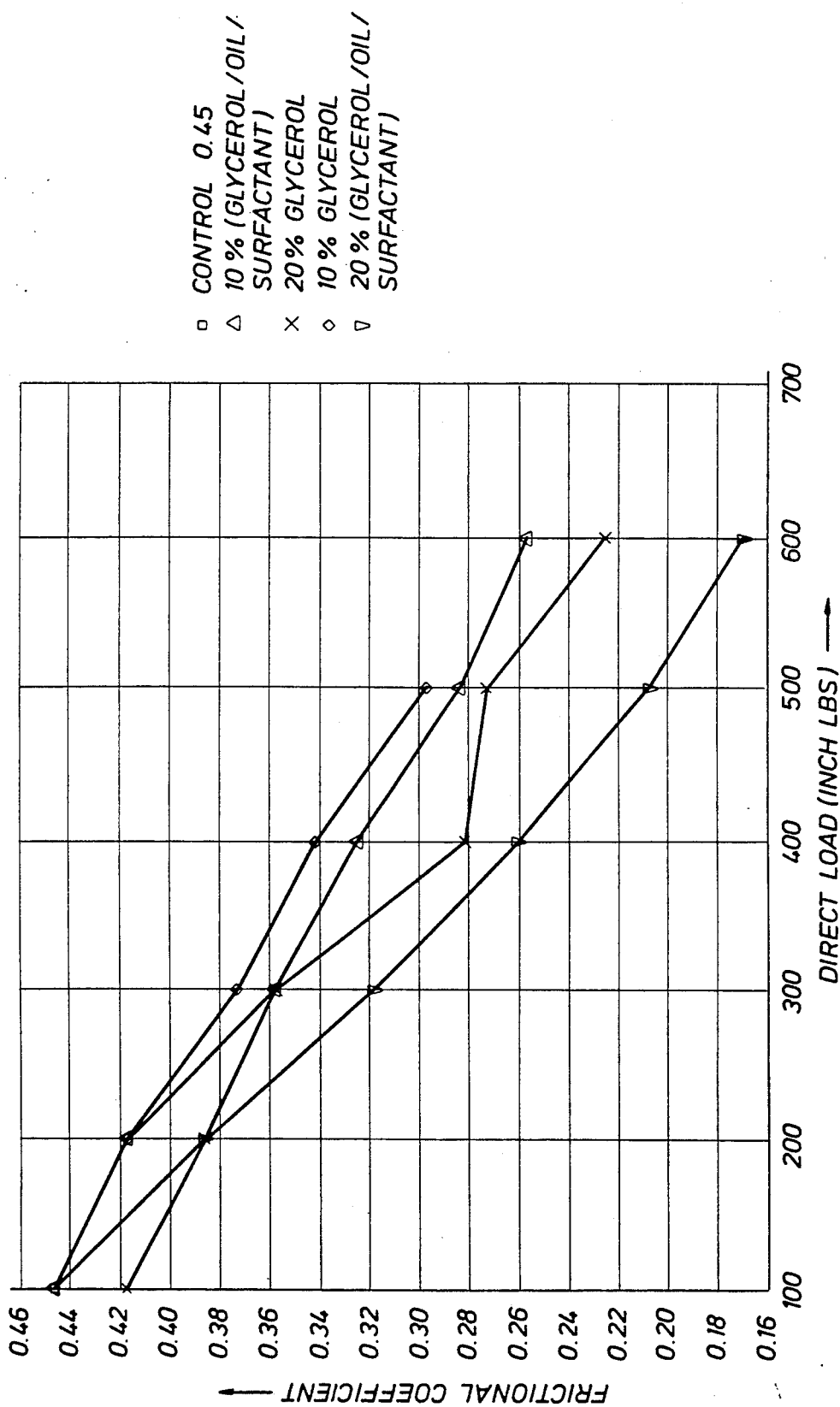
FIG.1 FRICTIONAL COEFFICIENTS FOR GLYCEROL AND GLYCEROL/OIL EMULSION

METHOD FOR DRILLING A WELL WITH EMULSION DRILLING FLUIDS

This is a continuation-in-part of application Ser. No. 07/503,496, filed Mar. 30, 1990, now abandoned which is a continuation-in-part of application Ser. No. 07/377,740, filed July 17, 1989, now abandoned which is a division of application Ser. No. 07/167,768, filed Mar. 14, 1988, now abandoned, and a continuation-in-part of application Ser. No. 07/373,606, filed June 30, 1989, now abandoned, which is a division of application Ser. No. 07/167,660, filed Mar. 14, 1988, now abandoned, and a continuation-in-part of application Ser. No. 07/353,195, filed May 12, 1989, now abandoned, which is a division of application Ser. No. 07/167,769, filed Mar. 14, 1988, now abandoned.

BACKGROUND OF THE INVENTION

This invention relates to water base drilling fluids. More particularly, the invention relates to water base drilling fluids having improved characteristics which allow low temperature drilling operations, inhibit formation of gas hydrates which form at low temperatures and high pressures, reduce shale dispersion which results in improved wellbore stability, reduce fluid loss, and are environmentally more safe.

Oil-in-water emulsion drilling fluids (or muds) generally comprise water, oil, emulsifier, clays or polymers, and various treating agents which control the physical, chemical and/or rheological properties of drilling fluids in wellbores. Any type of aqueous drilling fluid can be converted to an emulsion drilling fluid through the simple expedient of adding the desired amount of oil and emulsifier. The drilling fluid serves to remove chips, cuttings and the like produced by a rotating drill bit from a wellbore by circulating the drilling fluid down from the surface of the well, through the drill string, and out through openings in the drill bit such that the drilling fluid is then circulated upwardly in the annulus between the side of the wellbore and the rotating drill string.

The selection of a drilling fluid is primarily dependent upon the geological formation being drilled and the problems associated with such formation. Principal concerns in selection of a drilling fluid are temperature drilling conditions, formation of gas hydrates, shale dispersion, and drilling fluid loss and environmental requirements. Classically, temperature concerns associated with drilling oil/gas wells have been associated with deep hot wells (>300° F.); however, for deep water and/or Artic drilling low temperatures are a concern for two principal reasons: (1) freezing of the mud due to low temperature, especially if the well must be shut in for long durations and (2) the formation of gas hydrates under low temperature and high pressure conditions after the influx of gas. The present invention provides a drilling fluid additive which overcomes these and other problems in the art as more particularly disclosed hereinafter.

DISCUSSION OF RELEVANT ART

Applicants are not aware of any art which, in their judgment as persons skilled in the art of drilling fluids, would anticipate or render obvious the novel process and composition of the present invention. However, for the purpose of fully developing the background of the invention, the following discussion is provided.

U.S. Pat. No. 4,063,603 (Rayborn) relates to a drilling fluid lubricant. While the patent is principally directed to the use of plastic beads as a drilling fluid lubricant, a list of other materials under consideration as lubricating materials is provided which includes glycerines (Col. 2, line 3).

U.S. Pat. No. 4,508,628 (Walker et al) relates to oil base invert emulsion drilling fluids. In a list of temperature stabilizing additives (Col. 7, line 43) glycerine is mentioned. The presence of a salt, e.g., NaCl (Col. 4, line 64), is described.

U.S. Pat. No. 4,478,612 (Diaz et al) describes a process for drying supercritical $CO_2$ with glycerol.

U.S. Pat. No. 4,597,779 (Diaz) discloses that the formation of hydrates in $CO_2$ is prevented by adding a polyhydric alcohol hydrate inhibitor.

U.S. Pat. No. 4,456,067 (Penner) discloses a process for inhibiting the formation of gas hydrates in producing gas wells, said gas hydrate inhibitor being a hydroxy-containing compound having less than about 10 carbon atoms.

U.S. Pat. No. 3,738,437 (Scheureman) discloses the use of partially hydrolyzed polyarcylamide to avoid borehole instability.

SUMMARY OF THE INVENTION

The primary purpose of the present invention is to provide a drilling fluid, and process for the use thereof, which drilling fluid contains additives which depress the freezing point of the drilling fluid to allow low temperature drilling operations, inhibit formation of gas hydrates which form at low temperatures and high pressures, prevent shale dispersion which results in improved wellbore stability, reduce drilling fluid loss thereby reducing amounts of other fluid loss additives if any (e.g., gel-bentonite, carboxymethylcellulose, starch), and are environmentally more safe than oil base systems. Accordingly, the present invention is directed to an oil-in-alcohol emulsion water base drilling fluid comprising water, oil, emulsifier, clay or polymer, there being a sufficient amount of an alcohol such as glycerol or cyclicetherpolyol and, optionally, salt necessary to achieve the above purposes of the invention.

In addition, the present invention is directed to a method for drilling a well comprising rotating a drill string to cut a borehole into the earth; circulating water base drilling fluid through the drill string and through the annulus between the drill string and the wall of the borehole checking the drilling fluid for evidence of any of the following problems: freezing, gas hydrate formation, s hale dispersion and fluid loss; and adding oil-in-alcohol emulsion, optionally including salt, to the drilling fluid in an amount sufficient to overcome the above identified problems. Further, the present invention provides a method for drilling a well comprising determining whether the formation to be drilled will subject the drilling fluid to any of the following problems: freezing, gas hydrate formation, shale dispersion, and fluid loss; adding an oil-in-alcohol emulsion to the water base drilling fluid, optionally including salt, in an amount sufficient to overcome the above identified problems; rotating a drill bit to cut a borehole into the earth; and circulating the drilling fluid through a drill string and through an annulus between the drill string and the wall of the borehole.

Other purposes, distinctions over the art, advantages and features of the invention will be apparent to one skilled in the art upon review of the following.

BRIEF DESCRIPTION OF THE DRAWINGS

FIG. 1 illustrates frictional coefficients for glycerol and glycerol/oil surfactant emulsion.

DESCRIPTION OF PREFERRED EMBODIMENTS

Applicants have found that the use of an alcohol, preferably an acyclic polyol such as glycerol, a monoalicyclicpolyol, or a cyclicetherpolyol and, optionally salt in an appropriate amount, as an oil-in-alcohol emulsion water base drilling fluid substantially depresses the freezing point of the drilling fluid to eliminate problems with low temperature drilling operations, inhibits formation of gas hydrates which form at low temperatures and high pressures, prevents shale dispersion which results in improved wellbore stability, reduces drilling fluid loss thereby reducing amounts of other fluid loss additives if any (e.g., gel-bentonite, carboxymethylcellulose, starch), and is environmentally safe. Thus, according to the Applicant's method, the drill string is rotated to cut a borehole in the earth while circulating an oil-in-alcohol emulsion water base drilling fluid down through the drill string and thence up the annular between the drill string and the wall of the borehole. While this is occurring, a driller preferably is checking or observing the drilling fluid for evidence of the above noted problems. Alternatively, the formation may be known in advance to present certain problems, and the oil-in-alcohol emulsion water based drilling fluid may be utilized to overcome these problems.

In most instances, the applicable amount of oil-in-alcohol emulsion, optionally including salt, in the water base drilling fluid will be determined on a well-to-well basis. A concentration of alcohol in the oil-in-alcohol emulsion water base drilling fluid of from about 1 to 60, or preferably about 5 to 40 percent by weight and, optionally, of salt of from about 1 to 26, or preferably about 5 to 20 percent by weight, based on the total weight of the drilling fluid, will reduce the freezing point of the drilling fluid by about 1 to 80 in °F. A concentration of from about 1 to 60, or preferably about 10 to 40 percent by weight alcohol and, optionally, of from about 1 to 26, or preferably about 5 to 26 percent by weight salt, based on the total weight of the drilling fluid, will inhibit formation of gas hydrates. A concentration of from about 1 to 60, or preferably about 5 to 30 weight percent alcohol and, optionally, of from about 1 to 26, or preferably to about 5 to 20 percent by weight salt in the drilling fluid, based on the total weight of the drilling fluid, will prevent shale dispersion. A concentration of from about 1 to 60, or preferably about 5 to 40 weight percent alcohol in the drilling fluid and, optionally, of salt of from about 1 to 26, or preferably about 5 to 15 weight percent, based on the total weight of the drilling fluid, will reduce fluid loss from the drilling fluid through the wall of the wellbore.

Various inorganic salts are suitable for use with the invention, including but not limited to NaCl, NaBr, KCl, $CaCl_2$ and $NaNO_3$, among which NaCl is preferred. A synergistic effect is experienced when such a salt is used with alcohol as a mud additive package, i.e., an effect greater than the sum of the effects from salt and alcohol individually.

The oil employed to form the emulsion of the present invention may be mineral oil, crude oil, diesel fuel oil, kerosene, gas oil, or the like, and mixtures thereof.

In accordance with the present invention, any type of water base drilling fluid can be converted to an emulsion drilling fluid through the expedient of adding the desired amount of oil, emulsifier (surfactants) and alcohol (e.g., glycerol). Emulsion drilling fluids posses many advantages over regular drilling fluids, including but not limited to, increases drilling rate, longer bit life, fewer round trips, less torque on pipe, less drag on pipe, and improved hole conditions. Emulsifiers (surfactants) preferred for use with the present invention are diquarternary amines, alkylphenyl ethoxylates, alcohol ethoxylates, and amide ethoxylates. In accordance with the present invention it is highly preferred to first make an emulsion of the oil, surfactant and alcohol (e.g., glycerol). This emulsion is then emulsified or mixed with water. Emulsification preferably is accomplished through mechanical agitation.

The alcohol of the present invention is preferably any water soluble alcohol within the following groupings or mixtures thereof although any alcohol of less than 8 hydroxyl groups and less than 16 carbon atoms is suitable. Hereinafter "poly" is used to mean two or more, "mono" is used to mean one, "cyclic" is used to mean one or more rings, "ether" is used to mean one or more ether linkages, PECP will mean either of polyether-polycyclicpolyol, or polycyclicopolyetherpolyol.

A preferred class of alcohol components of this invention are acyclic polyols. Among acyclic polyols, preferred are those having at least 3 carbon atoms and 2 hydroxyl groups but no more than 80 carbon atoms and 60 hydroxyl groups. More preferably, the acyclic polyols of the invention have at least 9 carbon atoms and 5 hydroxyl groups but no more than 50 carbon atoms and 40 hydroxyl groups.

Another preferred class of alcohol components of this invention are monoalicylicpolyols. Among monoalicyclicpolyols, preferred are those having 5 to 30 carbon atoms and 2 to 10 hydroxyl groups.

A most preferred class of alcohol components of this invention are cyclicetherolyols. Among cyclicetherpolyols, preferred are those having at least 6 carbon atoms, at least 2 hydroxyl groups, and at least 2 ether linkages, but no more than 1800 carbon atoms, 450 hydroxyl groups, and 600 ether linkages. Even more preferred are cyclicetherpolyols having at least 15 carbon atoms, 5 ether linkages, and at least 5 hydroxyl groups, or at least 15 carbon atoms, at least 7 ether linkages, and at least 3 hydroxyl groups. Most preferred are cyclicetherpolyols having at least 18 carbon atoms, at least 6 hydroxyl groups, and at least 6 ether linkages but preferably no more than 1200 carbon atoms, 300 hydroxyl groups, and 400 ether linkages. Weight average molecular weights [defined infra] for the cyclicetherpolyols preferably range from 1,000 to 30,000 and more preferably from 5,000 to 20,000. Among the cyclicetherpolyols, monocyclicdietherdiols are preferred and polycyclicpolyetherpolyols are more preferred.

Nonlimiting examples include monomers, oligomers and telomers of polyhydric alcohols (or their precursors, or combinations thereof) such as glycerol, telomers of glycerol such as diglycerols, triglycerols, tetraglycerols, pentaglycerols, and hexaglycerols, mixtures of glycerol and telomers of glycerol such as diglycerol and triglycerols, mixtures of telomers of glycerol, 1,5,6,9-decantetrol, 1,2,4,5-cyclohexanetetramethanol, 1,2,4,7-heptanetetrol, 1,2,3,5-heptanetetrol, 4,4-dimethyl-1,2,3-pentanetriol, 1,3,4-cycloheptanetriol, 1,2,3-pentanetriol, 1,2,4-pentanetriol, 2,3,4-pentanetriol, 1,1- cyclopentanediol, 1,2,3-cyclopentanetriol, 1,2,3-hexantriol, 1,2,4-hexanetriol, 1,2,3,4-hexanetetrol, 1,2,4-cyclohexanetriol, 1,2,5-cyclohexanetriol, 1,2,3,4-cyclohexanetetrol, 1,2,3,5-cyclohexanetetrol, sorbitol, mannitol, and copolymers of ethylene glycol and propylene glycols with the preceding alcohols.

Cyclicetherpolyols can be obtained, for example, by extraction from saline water byproduct streams arising from the manufacture of epoxy resins, e.g., by reaction of epichlorohydrin and bisphenol A as described in U.S. Pat. Nos. 4,560,812 and 4,599,178, which are incorporated hereinto by reference thereto. The bottom stream obtained from the distillation of synthetic and natural glycerine, usually referred to as footstill bottoms, is also a convenient source of polycyclicpolyetherpolyols of the type referred to herein. In addition, a direct synthesis route is described hereinafter. The following structures are nonlimiting examples of this class of polyols. In order to obtain cyclic ethers, the number of moles of water expelled must be at least equal to the number of moles of glycerol (or other polyhydric, at least trihydric, polyol) used in the reaction mixture.

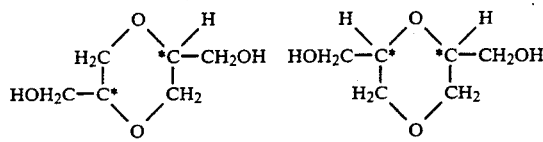

(A) and (B)
CIS or TRANS
2,5-bis(hydroxymethyl)
p-dioxane (C) and (D)
CIS and TRANS
2,6-bis(hydroxymethyl)
p-dioxane

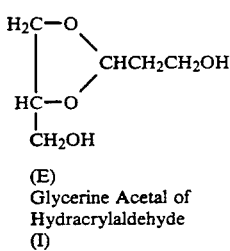

(E)
Glycerine Acetal of
Hydracrylaldehyde
(I)

In structures A through D, CIS and TRANS refer to the stereoisomerism of the carbon atoms marked by an asterisk. Structures A through D can also be called bis-hydroxymethyl 1,4-p-dioxanes.

Polycyclocpolyetherpolyols may in turn be prepared by polycondensation of compounds such a (A) through (E) supra in chemical processes which are accompanied by significant expulsion of water molecules from the polymerizing compounds. The number of ether linkages equals the number of water molecules expelled. Taking (C) or (D) supra as the building unit, the lowest molecular weight structure containing two such units is Structure (II) infra, containing two terminal hydroxyl groups, and five ether linkages. Structure (II) is formed by condensation from glycerol molecules with the expulsion of five water molecules.

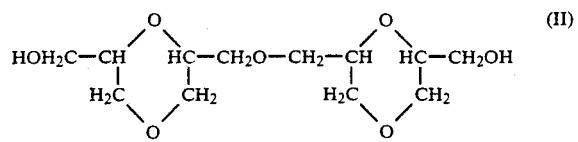

This structure is a di-cyclicpoly (or penta) etherdiol, and can be called di-bis-hydroxymethyl 1,4-p-dioxane.

Polycyclicpolyetherpolyols also can be formed by further condensation or polycondensation of Structure (II) with itself, or with itself and with polyhydric, at least trihydric, monomers, e.g., glycerol monomers. Dimerization of structure (II) with expulsion of one mole of water yields:

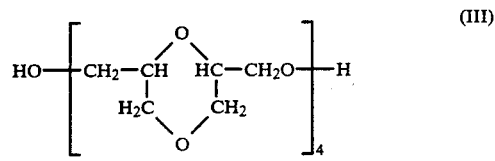

Copolycondensation of four structure (I) units with itself and with one polyhydric (at least trihydric) molecule, e.g., a glycerol molecule, can yield structure (IV) infra and its isomeric equivalents:

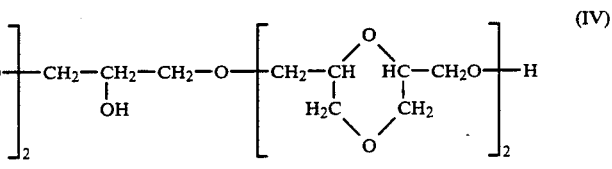

Analogous structures can be obtained from structures (I) (A), (I) B, and (I) E supra by polycondensation. Structures based on (E) supra will have five-membered rings. Spectroscopic techniques cannot conveniently distinguish between the 5 or 6 membered rings.

Structures (IV) contains twelve ether linkages, three hydroxyl groups, and four six-membered cyclic diethers, and is formed by the polycondensation of nine glycerol molecules by the expulsion of twelve water molecules. The cyclic diether units and the polycondensed glycerol units, or other polyhydric (at least trihydric) units, occur randomly in the structure. Disregarding the order of occurrence, a general chemical composition formula representative of all of these structures is:

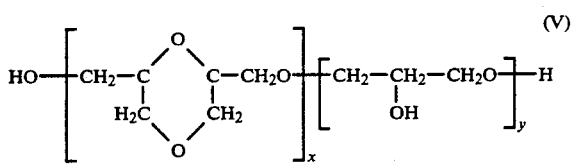

where $x \geq 1$ and $y \geq 0$.

Preparation of cyclicetherpolyols for the practice of this invention can be obtained by direct synthetic route. For example, starting with glycerol, chlorohydrin can be produced, which upon treatment with NaOH at elevated temperatures yields glycidol. This molecular structure cyclicizes at still higher temperature to yield bis hydroxymethyl 1,4-p-dioxane.

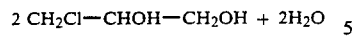

γ-monochlorohydrin

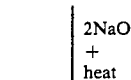

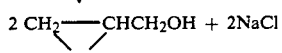

glycidol

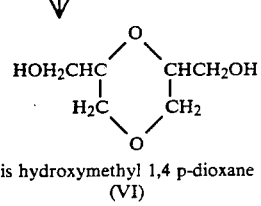

bis hydroxymethyl 1,4 p-dioxane
(VI)

To make the higher molecular weight components from bis hydroxymethyl-1,4 p-dioxane and its isomers (I) (A-E) supra, the cyclic dimer is heated with acid (e.g., sulfuric acid) or basic (e.g., sodium acetate) catalyst while maintaining low pressure to facilitate continuous removal of the water being expelled during the condensation process. The rate of dehydration increases with increasing temperature, but excessive temperatures should be avoided to eliminate polymerization to intractable mixtures. Also it is essential to maintain an oxygen-free atmosphere over the solution while the reaction proceeds to avoid excessive oxidation and carbonization. Temperatures in the range of 150° C. to 350° C. can be employed with pressures ranging from subatmospheric to several atmospheres. The vapor pressure of the water-free organic mixture is reduced as the average molecular weight increases by condensation. However, the formation of water increases the pressure of the reactive mixture, and allows easy removal by continuous distillation of the produced water. The extent of polycondensation can be monitored by measuring the weight of produced water. For best results the moles of water expelled should be at least equal to the starting number of polyhydric (at least trihydric) moles, e.g., glycerol moles. In a preferred composition the number of moles expelled by polycondensation should be between 20% and 70% greater than the number of the polyhydric, or at least trihydric, moles of alcohol in the reacting mixture. For example, from a starting feed of 9000 grams of glycerol, 2200 to 2900 grams of water can be removed during the polycondensation process or about 24% to 32% of the initial glycerol weight.

The monomeric units which can enter into the polycondensation reactions to yield desirable polyethercyclic polyols are alcohols containing at least three hydroxyl groups per molecule of which at least two are vicinal. Thus, glycols of any molecular weight do not meet the requirements of this most preferred embodiment. On the other hand, triols are quite suitable. Examples are butane triols, such as 1,2,4 butanetriol, pentane triols, such as 1,2,3 pentanetriol, etc. An important class of polyhydric alcohols with straight carbon chains and four or more hydroxyl groups, called sugar alcohols, can also be used in preparing additive formulations containing cyclic polyethers. Sorbitol and mannitol are two such well known polyhydric alcohols.

A monomer of the structure:

will yield several structures, one of which is illustrated by:

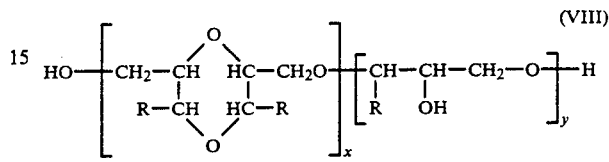

The R group may itself be a group containing hydroxymethyl groups, which would in turn increase the potential for intermolecular condensation by expulsion of additional moles of water, and would increase the facility with which high molecular weight cyclic ether structures are obtained.

Examples of cyclicdietherpolyols can be obtained from trihydric alcohols with more than three carbons such as the following:

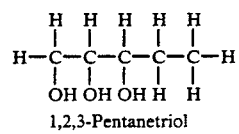

1,2,3-Pentanetriol

The following monocyclicdietherdiols of pentanetriol are obtained from Structure IX in accordance with the methods described supra:

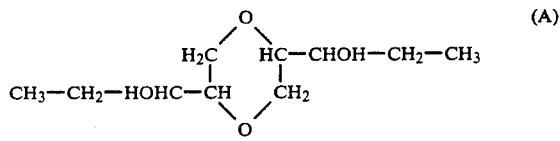

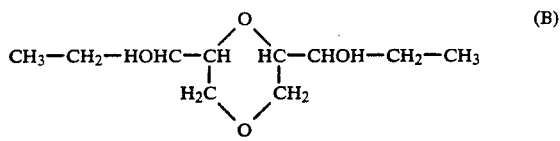

Both dimers (A) and (B) are obtained from Structure IX by reacting at carbons 1 and 2.

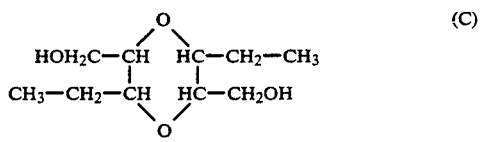

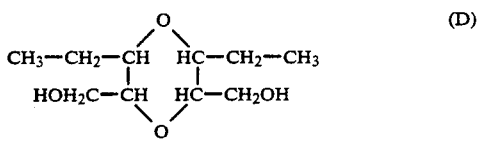

Both dimers (C) and (D) are obtained by reacting Structure (IX) at carbons 2 and 3.

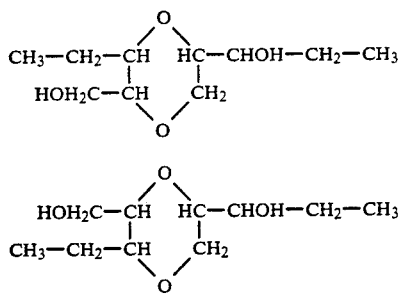

Dimers (E) and (F) are obtained from (IX) by reacting at 1,2 and at 2,3 positions. Further polycondensation of the cyclicetherdiols supra will yield polycyclicpolyetherpolyols with structures which depend on which hydroxyl groups are involved in the condensation reaction. For instance, reaction between Structures (X) A supra and (X) F supra will yield (XI) infra, a dicyclic-pentaentaetherdiol of pentanetriol as follows. Obviously, a large number of possible polycondensed structures exist.

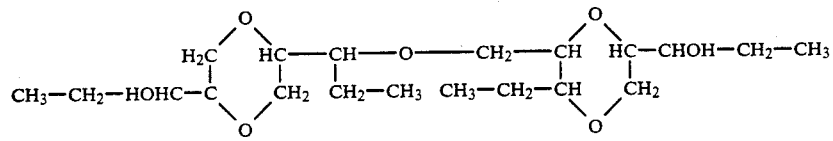

The molecular weight of a typical composition which was found to provide excellent properties in the drilling fluid of this invention upon addition to a level of 2% w, had molecular weight parameters as determined infra. Number average molecular weight $M_n$ is shown by the following:

$$M_n = \frac{\sum_i n_i M_i}{\sum_i n_i} \geq 1230$$

This is the average molecular weight obtained when the total weight of the sample is divided by the number of molecules in the sample. This molecular weight determines the effect of the sample on the osmotic pressure and hence, the effect of the sample on the freezing point or other colligative properties of the total mixture. This $M_w$ valve represents GPC results expressed in terms of PEG numbers obtained by using two Ultrahydrogel columns, a 250 angstroms column and a 120 angstroms column connected in series using water as solvent at 30° C.

The weight average molecular weight was found to be:

$$M_w = \frac{\sum_i n_i M_i^2}{\sum_i n_i M_i} \geq 10550$$

This molecular weight, weighs molecules proportionally to their molecular weight in the averaging process; that is, the molecular weight $M_i$, is multiplied by the weight $n_i M_i$ of material of that molecular weight rather than by the number of molecules. This type of average reflects the effect of the sample on those properties which depend on the size of the individual molecules, such as effectiveness in light scattering, or ability of the molecule to penetrate into small openings. Thus, a high $M_w$ would be beneficial if penetration of the molecules into the interplanar structure of layered clays in the formation is to be avoided. While the invention is not limited by this theory, it is believed that such a property minimizes the swelling of clay components in the wellbore, thereby improving wellbore stability.

The ratio $M_w/M_n$ is also an indication of the spread or polydispersity in the molecular weight of molecules present in the sample, and is by definition $M_w \geq M_n$. This ratio is 8.6 for the most preferred formulation, PECP.

Most preferred samples of polycyclicpolyetherpolyols with beneficial effects on the properties of drilling fluids have been found to have $M_m$ values in the order of about 150 to about 2000 and $M_w$ values in the order of 1500 to 12,000. The $M_n$ and $M_w$ values for POLS are 130-145 and 700-875, respectively, but POLS (see below) is superior to many other alcohols in carrying out the purposes of this invention.

Structural determination of mixtures using Mass Spectroscopy has yielded x values (see structures V and VIII supra) of 1 to 4 in portions of the sample not exceeding 14 glycerol units, thus indicating that in a significant portion of the sample $x \geq y/2$, although the invention is not limited to this theory. This procedure is limited with regard to the molecular weight of structures that it can determine, to molecules with about 50 carbon atoms.

In accordance with a highly preferred embodiment of the invention, polycyclicpolyetherpolyols having superior characteristics are produced by thermal condensation of glycerol in distillation apparatus under conditions which allow water to be removed overhead, but not substantial amounts of glycerol or its dimers or trimers. A catalyst is required, preferably an alkali metal hydroxide, more preferably sodium hydroxide, in a preferred concentration of 0.5-1.5 percent by weight of the reaction mixture, and preferably including an alkali metal acetate, more preferably sodium acetate, in like or smaller amounts.

The mixture is heated, preferably between 150 and 350 mm Hg and free water is distilled off continuously, allowing the equilibrium limited reaction to proceed further and to completion. The glycerol will then begin to rise in temperature to about 210°-230° C. at 120-180 mm Hg, at which temperature the mixture refluxes, indicating the onset of The mixture is heated, preferably between 150 and 350 mm Hg and free water is distilled off continuously, allowing the equilibrium limited reaction to proceed further and to completion. The glycerol will then begin to rise in temperature to about 210°-230° C. at 120-180 mm Hg, at which temperature the mixture refluxes, indicating the onset of reactions which produce water by condensation of the glycerol. By maintaining the pressure at up to 180 mm Hg, the glycerol, which may volatilize along with the water, is condensed in an overhead condenser, and preferably cooled by a coolant.

The glycerol and its linear and cyclic dimers which form in the course of the volatilization process, are condensed and refluxed to the reacting mixture. Gradually the procedure results in an increase in the boiling point of the mixture, brought about by the continuous removal of water of condensation and by the increase of the molecular weight of the mixture.

As the degree of polymerization increases, and the water removed from the glycerol feed increases, the pressure over the mixture is gradually decreased externally, either in a continuous, preferably gradual mode, or at selected reaction temperatures. For example, it is possible to reduce the pressure to 120 mm Hg when the mixture reaches 250° C. at a pressure of 180 mm Hg. Alternatively, it is possible to control the pressure to diminish gradually by a known mechanical means.

The preferred way to achieve extensive dehydration without undesirable crosslinking and gelation of the polycyclicpolyetherpolyols is by the addition of small amounts of glycerol, at a later stage of the reaction, for example, when the reaction medium temperature has reached 270°–280° C. at a pressure of 50–100 mm Hg, preferably 60–90 mm Hg. Upon addition of 2–6 percent by weight of glycerol, basis final weight of glycerol added, at a point after removal, for example, of 0.8 moles of water per mole of glycerol, a drop in the temperature of the reaction mixture occurs, the drop being several degrees Centigrade or Fahrenheit. The drop is caused by the lower temperature of the glycerol being added, but more importantly indicates the endothermic nature of the reaction between glycerol molecules, or between glycerol molecules and added glycerol molecules, or between added glycerol molecules with reactive sites in the polymerizing mixture. For better effectiveness, the glycerol may be presaturated with alkaline metal hydroxide, e.g., sodium hydroxide.

Upon continued input of heat from an external source, the temperature of the reacting mixture rises to the previous highest level, or to a higher level, or to a somewhat lower level than a first high temperature, depending upon the molecular weight distribution of polycyclicpolyetherpolyols in the mixture. This procedure of incremental glycerol addition can be repeated a number of times, three being a convenient number. With three additions of glycerol the experimental reaction time between onset of reaction and its completion usually takes 5–10 hours depending on the temperature and pressure of additions and the amount of glycerol added each time. As the reaction approaches 85 percent completion it is suitable to combine glycerol additions with further reductions of pressure, going down to b 30 mm Hg or even lower. As the reaction approaches completion, it turns from being highly endothermic to being thermally neutral, and at a dehydration approaching and exceeding 1.2 moles of water per mole of glycerol, it can become exothermic. This is a reflection of the propensity of the mixture to undergo rapid crosslinking of the complex polycyclicpolyetherpolyol structures. In order to avoid the occurrence of such an undesirable crosslinking reaction, it is preferred to buffer the reaction by adding a small amount of glycerol, for example, 0.3–0.9 percent or up to 1.5 percent by weight total. Preferably there is added 0.5 percent by weight of glycerol at a selected time or preferably at a point where the reaction is 96 percent complete, after removal of 1.12–1.15 moles of water per mole of glycerol in the reaction medium.

It has been found that the addition of minor amounts of epoxy resins to the reaction mixture are beneficial. Preferred epoxy resins are diglycidyl ethers, triglycidyl ethers, and tetraglycidyl ethers which, in the reacting glycerol medium, result in formation of higher molecular weight polycyclicpolyetherpolyols which substantially improve properties in connection with drilling fluid performance. Polycyclicpolyetherpolyols resulting from this process are characterized by binodal molecular weight distribution, $M_w$ in excess of 50,000, said $M_w$ being determined in a three-column gel permeation chromatography, and being 0.5 to 10% w epoxy structures. The polycyclicpolyetherpolyols are further characterized by molecular structures which are no more than 20% free of associated cyclic formations.

Experimental results show that the impact of using multifunctional glycidyl ethers on the value of $M_n$ and on the performance, particularly as regards swelling of clays when the invention is used as a drilling fluid additive, is truly significant. Thus, when using 3.0% w Epon 828 (difunctional glycidyl ether) and 3.0% w Epon 1031 (tetrafunctional glycidyl ether) tradenames of Shell Oil Company, the $M_w$ values are correspondingly 78,015 and 151,000, and the swelling inhibition is the highest with Epon 1031, with good performance on fluid loss and on dispersion. The immediately preceding $M_w$ values are expressed in terms of true molecular weight in units of Daltons by using three Ultrahydrogel columns, a Linear column, a 250 angstroms column and a 120 angstroms column in series, using water as the solvent at 30° C.

The effectiveness of adding a commercially available polyol mixture (herein referred to as POLS) and polyetherpolycyclipolyols (herein referred to as PECP) prepared by Shell Chemical Company to inhibit cuttings dispersion are hereinafter shown for different drilling fluid combinations. The POLS sample tested herein was analyzed to be 46.8% w propylene glycol with 16.6% w linear dimers, 17.5% w linear trimers, 3.8% w linear tetramers, 3.2% w linear pentamers, and 0.88% w linear hexamers of propylene glycol, with less than 0.5% w cyclics, 11% w water and 0.2 to 0.5% w Na+ and K+. A typical PECP sample tested was 0.16% w glycerol, 11.4% w p-dioxanes, 1.1% w cyclic trimers of glycerol, 4% w cyclic and dicyclic tetramers of glycerol, 2% w cyclic and dicyclic pentamers of glycerol, 2% w dicyclic and tricyclic hexamers of glycerol, 2% w dicyclic and tricyclic heptamers of glycerol, 3% w dicyclic and tricyclic octamers of glycerol, 4% w dicyclic and tricyclic nonamers of glycerol, 27% w polycyclicpolyetherpolyols having at least 30 carbon atoms and at least 2 cyclic ethers per molecule, 37.5% w water, and 0.5% NaCl. The results indicate that PECP in combination with oil and surfactant is an effective inhibitor of cuttings dispersion. Typically PECP with oil and surfactant is more effective at inhibiting cuttings dispersion than glycerol in combination with oil and surfactant.

Drilling fluid properties should be such as to promote safe and speedy drilling and completion of the well with the maximum productive capacity. Use of emulsion drilling fluids of controlled properties requires expenditure of large sums of money, and to carry out its role properly, the drilling fluid must be protected against the effects of freezing conditions, gas hydrate formation, shale dispersion and fluid loss. The use of alcohol/oil emulsion in a water base drilling fluid, optionally including salt, readily protects the drilling fluid against freezing conditions and gas hydrate formation by lowering the freezing point of the drilling fluid. With respect to shale dispersion and fluid loss, the use of alcohol/oil emulsion in a water base drilling fluid, optionally including salt, aids in deposition of an impermeable filter cake, and the filter cake in turn prevents fluid loss and shale dispersion. The filter cake performs its job primarily on the basis of its impermeability to water. If the formation permeability and the fluid-loss properties of the mud are both high, large quantities of fluid will flow through the wall cake and into the permeable formation, leaving a thick wall cake behind. This cake may become so thick as to seriously interfere with movement of the drill pipe when it is withdrawn and may even result in sticking the pipe. If a thick cake is formed over the face of the producing formation, it may not become properly cleaned off during the well completion process and will interfere with the production rate of the well. The fluid which passes into the formation may also exercise an influence. When the drilling fluid is water based and shales and clays which are susceptible to hydration are drilled, the use of high fluid loss drilling fluid may result in swelling and heaving of the shale, slow drilling rates, stuck pipe, fishing jobs and even loss of the hole. If the producing formation contains hydratable clays, the intrusion of water may result in swelling of the clay particles within the sandy formation and permanent loss of permeability with resulting impaired production rates. The additive package of the present invention readily solves such problems by increasing the impermeability of the filter cake to water, thus decreasing the fluid-loss properties of the drilling fluid.

The following examples are illustrative of the application of the process of the present invention and of the drilling fluid composition, and are not to be construed as limiting the scope thereof.

In Table 1 data are shown that indicate that the addition of glycerol, oil and surfactant enhances performance in terms of inhibiting cuttings dispersion. Each of the components oil, surfactant, and glycerol were added separately to fresh water or fresh water with NaCl. To evaluate the synergistic effects, the percent shale retained in fresh water was subtracted from all of the other test solutions. To determine synergy between oil, surfactant and glycerol the percent retained (minus percent retained in fresh water) of the glycerol/fresh water, oil/fresh water and surfactant/fresh water were added together. This result is a predicted value of 4.9 percent retained. This is significantly less than what was obtained when all three components were added into the same test solution.

When salt was present it was found that the percent retained of the individual components (glycerol, oil and surfactant) in fresh water (minus the percent retained in fresh water) plus NaCl in fresh water (minus the percent retained in fresh water) was 37.6 percent retained. This was significantly less than what was observed when all four reagents were in the same test solution. These results suggest a synergistic action between the different additives being tested.

The results of the tests of Table 1 suggested that the combination of these additives was not only an improvement, but was synergistic in terms of inhibiting shale dispersion. As a means of improving the emulsification of the additives an emulsion of oil, glycerol and surfactant was made prior to adding to fresh or salt water. This emulsion was stable at room temperature for weeks. The effectiveness of this emulsion to inhibit cuttings dispersion is shown in Table 2.

The emulsion was tested for inhibition of cuttings dispersion (Table 2) of two shales. The results indicate that the emulsion is an effective inhibitor of cuttings dispersion and that a synergistic relationship exists between the presence of glycerol and oil/surfactant.

TABLE 1

Synergy Between Oil[1], Surfactant[2], and Glycerol[5]

| Green Canyon 12,535 Feet | Experimental (percent retained) | Experimental minus Fresh Water | Predicted Oil[1] + Glycerol[5] + Surfactant[2] | Predicted NaCl[3] + Oil[1] + Glycerol[5] + Surfactant[2] |
|---|---|---|---|---|
| Fresh Water[6] | 2.5 | | | |
| Fresh Water (10%v Glycerol) | 4.0 | 1.5 | | |
| Fresh Water (10%v Oil[1]) | 4.2 | 1.7 | | |
| Fresh Water (1%v Surfactant[2]) | 4.2 | 1.7 | | |
| Fresh Water (10%v Oil[1]/ 0.1%v Surfactant[2]) | 3.6 | 1.1 | | |
| Fresh Water (10%v Oil[1]/1%v Surfactant[2]/10%v Glycerol[5]) | 20.0 | 17.5 | 4.9 | |
| 0.150 M[4] NaCl[3,6] | 35.2 | 32.7 | | |
| 0.15 M[4] NaCl[3] (1%v Surfactant[2]) | 63.2 | 60.7 | | |
| 0.15 M[4] NaCl[3] (10%v Glycerol) | 50.7 | 48.2 | | |
| 0.15 M[4] NaCl[3] (10%v Oil[1]) | 36.2 | 33.7 | | |
| 0.15 M[4] NaCl[3] (10%v Oil[1]/ 1%v Surfactant[2]) | 65.6 | 63.1 | | |
| 0.15 M[4] NaCl[3] (10%v Oil[1]/ 1%v Surfactant[2]/10%v | 72.8 | 70.3 | | 37.6 |

TABLE 1-continued

Synergy Between Oil[1], Surfactant[2], and Glycerol[5]

| Green Canyon 12,535 Feet | Experi-mental | Experi-mental minus Fresh Water | percent retained Predicted Oil[1] + Glycerol[5] + Surfactant[2] | Predicted NaCl[3] + Oil[1] + Glycerol[5] + Surfactant[2] |
|---|---|---|---|---|
| Glycerol[5]) | | | | |

[1]Mineral Oil.
[2]Ethoxylated tallow amine.
[3]NaCl always refers to 0.15 M NaCl. Percentage of alcohols, glycerols, and surfactants is always percent by volume.
[4]M means molar.
[5]The oil/surfactant/glycerol emulsions were at a ratio of 24/1/75 percent by volume.
[6]Fresh water without XC resulted in 2.1 percent retained; 0.15 M NaCl without XC resulted in 32.4 percent retained.

Percent volume (%v) is based on total volume of solution. Test fluids and shale were hot rolled for 45 seconds at 150° F. After the shale test solution mixture was hot rolled, the shale was sized over 10, 30, and 80 mesh screen and dried. The data are expressed as percent retained of the original weight (2.5 gm).

XC polymer, which is a water soluble polysaccharide sold under the trade name "Kelzan XC" by Kelco Corp., was added to the fresh water and NaCl test solutions (0.2 lb/bbl) for viscosity control. As a result, all of the test solutions had an apparent viscosity of approximately 2.0 centipoise as measured on a Fann 35A.

TABLE 2

Effectiveness of Emulsified Oil[1]/Surfactant[2]/Glycerol[5] Combination

| | Experi-mental | Experi-mental minus Fresh Water | percent retained Predicted Oil[1] + Glycerol[5] + Surfactant[2] | Predicted NaCl[3] + Oil[1] + Glycerol[5] + Surfactant[2] |
|---|---|---|---|---|
| Green Canyon 12,535 Feet | | | | |
| Fresh Water[6] | 2.4 | | | |
| Fresh Water (7.5%v Glycerol) | 3.7 | 1.3 | | |
| Fresh Water (2.4%v Oil[1]) | 2.7 | 0.3 | | |
| Fresh Water (0.1%v Surfactant[2]) | 2.6 | 0.2 | | |
| Fresh Water (2.4%v Oil[1]/ 0.1%v Surfactant[2]) | 2.7 | 0.3 | | |
| Fresh Water (10%v Oil[1]/ Surfactant[2]/Glycerol[5]) | 16.5 | 14.1 | 1.8 | |
| 0.15 M[4] NaCl[3,6] | 34.6 | 32.2 | | |
| 0.15 M[4] NaCl[3] (7.5%v Glycerol) | 41.2 | 38.8 | | |
| 0.15 M[4] NaCl[3] (2.4%v Oil) | 35.0 | 32.6 | | |
| 0.15 M[4] NaCl[3] (0.1%v Surfactant[2]) | 33.8 | 31.4 | | |
| 0.15 M[4] NaCl[3] (2.4%v Oil[1]/ 0.1%v Surfactant[2]) | 36.0 | 33.6 | | |
| 0.15 M[4] NaCl[3] (10%v Oil[1]/ Surfactant[2]/Glycerol[5]) | 55.2 | 52.8 | | 34.0 |
| South Timbalier 7,605 Feet | | | | |
| Fresh Water[6] | 16.0 | | | |
| Fresh Water (7.5%v Glycerol) | 20.4 | 4.4 | | |
| Fresh Water (2.4%v Oil[1]) | 17.2 | 1.2 | | |
| Fresh Water (0.1%v Surfactant[2]) | 17.5 | 1.5 | | |
| Fresh Water (2.4%v Oil[1]/ 0.1%v Surfactant[2]) | 21.2 | 5.2 | | |
| Fresh Water (10%v Oil[1]/0.1%v Surfactant[2]/Glycerol[5]) | 32.2 | 16.2 | 7.1 | |
| 0.15 M[4] NaCl[3,6] | 38.6 | 22.6 | | |
| 0.15 M[4] NaCl[3] (7.5%v Glycerol) | 51.2 | 35.2 | | |
| 0.15 M[4] NaCl[3] (2.4%v Oil[1]) | 39.2 | 23.2 | | |
| 0.15 M[4] NaCl[3] (0.1%v Surfactant[2]) | 39.0 | 23.0 | | |
| 0.15 M[4] NaCl[3] (2.4%v Oil[1]/ 0.1%v Surfactant[2]) | 45.1 | 29.1 | | |
| 0.15 M[4] NaCl[3] (10%v Oil[1]/ | 57.9 | 41.9 | | 28.5 |

TABLE 2-continued

Effectiveness of Emulsified Oil[1]/Surfactant[2]/Glycerol[5] Combination

| | | percent retained | | |
|---|---|---|---|---|
| | Experimental | Experimental minus Fresh Water | Predicted Oil[1] + Glycerol[5] + Surfactant[2] | Predicted NaCl[3] + Oil[1] + Glycerol[5] + Surfactant[2] |
| 0.1%v Surfactant[2]/Glycerol[5]) | | | | |

[1]Mineral Oil.
[2]Ethoxylated tallow amine.
[3]NaCl always refers to 0.15 M NaCl. Percentage of alcohols, glycerols, and surfactants is always percent by volume.
[4]M means molar.
[5]The oil/surfactant/glycerol emulsions were at a ratio of 24/1/75 percent by volume.
[6]Fresh water without XC resulted in 2.1 percent retained; 0.15 M NaCl without XC resulted in 32.4 percent retained.

To evaluate the synergistic effects, the percent shale retained in fresh water was subtracted from all of the other test solutions. To determine synergy between oil, surfactant, and glycerol, the percent retained (minus percent retained in fresh water) of the glycerol/fresh water, oil/fresh water, and surfactant/fresh water were added together. This result is the predicted value.

This value is significantly less than what was obtained when all three components were in the same test solution.

When salt was present it was found that the percent retained of the individual components (glycerol, oil, and surfactant) in fresh water (minus the percent retained in fresh water) plus NaCl in fresh water (minus the percent retained in fresh water) represented the predicted percent retained. This was significantly less than what was observed when all four reagents were in the same test solution. These results suggest a synergistic action between the different additives being tested.

Test fluids and shale were hot rolled for 45 seconds at 150° F. After the shale test solution mixture was hot rolled, the shale was sized over 10, 30, and 80 mesh screen and dried. The data are expressed as percent retained of the original weight (2.5 gm). XC polymer, which is a water soluble polysaccaharide sold under the trade name "Kelzan XC" by Kelco Corp., was added to the fresh water and NaCl test solutions (0.2 lb/bbl) for viscosity control.

As a result, all of the test solutions had an apparent viscosity of approximately 2.0 centipoise as measured on a Fann 35A.

TABLE 2A

Synergy Between Emulsified Oil[1], Surfactant[3], and PECP

| | | percent retained | | |
|---|---|---|---|---|
| | Experimental | Experimental minus Fresh Water | Predicted Oil[1] + PECP + Surfactant[2] | Predicted NaCl[3] + Oil[1] + PECP + Surfactant[2] |
| Green Canyon 12,535 Feet | | | | |
| Fresh Water | 3.0 | | | |
| Fresh Water (7.4%v PECP) | 12.5 | 9.5 | | |
| Fresh Water (2.5%v Oil[1]) | 3.5 | 0.5 | | |
| Fresh Water (0.1%v Surfactant[2]) | 4.0 | 1.0 | | |
| Fresh Water (10%v Oil[1]/0.1%v Surfactant[2]/7.4%v PECP) | 38.9 | 35.9 | 11.0 | |
| Fresh Water (2.5%v Oil[1]/0.1%v Surfactant[2]) | 6.0 | 3.0 | | |
| 0.15 M[4] NaCl[3] | 36.5 | 33.5 | | |
| 0.15 M[4] NaCl[3] (0.1%v Surfactant[2]) | 62.5 | 59.5 | | |
| 0.15 M[4] NaCl[3] (2.5%v Oil[1]/0.1%v Surfactant[2]) | 66.7 | 63.7 | | |
| 0.15 M[4] NaCl[3] (10%v Oil[1]/0.1%v Surfactant[2]/7.4%v PECP) | 86.6 | 83.6 | | 44.5 |
| South Timbalier 7,605 Feet | | | | |
| Fresh Water | 14.6 | | | |
| Fresh Water (7.4% PECP) | 26.5 | 11.9 | | |
| Fresh Water (7.4%v Oil[1]) | 15.0 | 0.4 | | |
| Fresh Water (0.1%v Surfactant[2]) | 19.0 | 4.4 | | |
| Fresh Water (2.5%v Oil[1]/0.1%v Surfactant[2]) | 22.3 | 7.7 | | |
| Fresh Water (10%v Oil[1]/0.1%v Surfactant[2]/7.4%v PECP) | 58.3 | 43.7 | 16.7 | |
| 0.15 M[4] NaCl[3] | 40.6 | 26.0 | | |
| 0.15 M[4] NaCl[3] (7.4%v PECP) | 65.9 | 51.3 | | |
| 0.15 M[4] NaCl[3] (2.5%v Oil[1]) | 41.3 | 26.7 | | |
| 0.15 M[4] NaCl[3] (0.1%v Surfactant[2]) | 42.3 | 27.7 | | |
| 0.15 M[4] NaCl[3] (2.5%v Oil[1]/0.1%v Surfactant[2]) | 50.3 | 35.7 | | |
| 0.15 M[4] NaCl[3] (10%v Oil[1]/0.1%v Surfactant[2]/7.4%v PECP) | 81.3 | 66.7 | | 42.7 |
| Green Canyon 12,545 Feet | | | | |
| Fresh Water | 2.1 | | | |

TABLE 2A-continued

Synergy Between Emulsified Oil[1], Surfactant[3], and PECP

| | percent retained | | | |
|---|---|---|---|---|
| | Experimental | Experimental minus Fresh Water | Predicted Oil[1] + PECP + Surfactant[2] | Predicted NaCl[3] + Oil[1] + PECP + Surfactant[2] |
| Fresh Water (0.1%v Surfactant[2]) | 2.3 | 0.2 | | |
| Fresh Water (7.4%v PECP) | 13.9 | 11.8 | | |
| Fresh Water (2.5%v Oil[1]) | 2.3 | 0.2 | | |
| Fresh Water (2.5%v Oil[1]/ 0.1%v Surfactant[2]) | 5.4 | 3.3 | | |
| Fresh Water (10%v Oil[1]/0.1%v Surfactant[2]/7.4%v PECP) | 40.3 | 38.2 | 12.2 | |
| 0.15 M[4] NaCl[3] | 33.5 | 31.4 | | |
| 0.15 M[4] NaCl[3] (7.4%v PECP) | 74.1 | 72.0 | | |
| 0.15 M[4] NaCl[3] (2.5%v Oil[1]) | 31.0 | 28.9 | | |
| 0.15 M[4] NaCl[3] (2.5%v Oil[1]/ 0.1%v Surfactant[2]) | 65.3 | 63.2 | | |
| 0.15 M[4] NaCl[3] (0.1%v Surfactant[2]) | 60.2 | 58.1 | | |
| 0.15 M[4] NaCl[3] (10%v Oil[1]/0.1%v Surfactant[2]/7.4%v PECP) | 80.3 | 78.2 | | 43.6 |

[1]Mineral Oil.
[2]Ethoxylated tallow amine.
[3]NaCl always refers to 0.15 M NaCl. Percentage of alcohols, glycerols, and surfactants is always percent by volume.
[4]M means molar.
Samples were hot rolled at 150° F. for 45 seconds.
The oil, surfactant, and PECP were added percent by volume at a ratio of 25/1/74 by volume respectively.
The emulsion was added at 10%.

In Table 3 different combinations of oil, alcohol, and salt were tested for inhibition of cuttings dispersion of Pierre shale. The results indicate that the combination of alcohol, salt, and surfactant emulsified together are effective inhibitors of cuttings dispersion. Also shown is a direct comparison between PECP and glycerol in combination with surfactant and oil. The results clearly suggest that PECP is superior to glycerol.

Table 4 provides freezing point depression data which indicate that the oil/glycerol/surfactant mixture lowers the freezing point of fresh water and salt water. This result suggests that this emulsion can be used to prevent freezing of mud in cold environments. In addition, it indicates that this emulsion will reduce the probability of forming gas hydrates in the drilling fluid.

In Table 5 data are presented showing that the alcohol/oil/surfactant emulsion can be used in a mud formulation without severely altering the primary rheological or fluid loss properties.

TABLE 3

Effectiveness of Different Systems in the Presence of NaCl

| | Apparent Viscosity | percent retained Time (Hours) | | | | | |
|---|---|---|---|---|---|---|---|
| Formulations | (cps) | 18 | 45 | 145 | 200 | 300 | 450 |
| Fresh Water/added XC[1] 0.2 lb/bbl | 2 | 8.0 | 0.2 | — | — | — | — |
| 20% NaCl/added XC[1] 0.2 lb/bbl | 2 | 92.5 | 85.3 | 57.5 | 45.2 | 22.3 | — |
| 20% NaCl without XC | 1 | 91.6 | 84.7 | 58.2 | 44.3 | 23.1 | — |
| 20% NaCl (10% Glycerol) | 2 | 97.8 | 93.5 | 85.3 | 79.8 | 68.6 | — |
| 20% NaCl (5% PECP) | 2 | 97.7 | 96.0 | 93.5 | 90.0 | 82.9 | 72.3 |
| 20% NaCl (10% Oil[4]/Surfactant[3]) | 2 | 95.6 | 92.3 | 68.3 | 55.3 | 35.6 | — |
| 20% NaCl (10% (Oil[4]/Surfactant[3]/ Glycerol) | 2 | 98.6 | 97.3 | 92.3 | 88.6 | 82.3 | — |

TABLE 3-continued

Effectiveness of Different Systems in the Presence of NaCl

| | Apparent Viscosity | percent retained Time (Hours) | | | | | |
|---|---|---|---|---|---|---|---|
| Formulations | (cps) | 18 | 45 | 145 | 200 | 300 | 450 |
| 20% NaCl (2% (Oil[4])/Surfactant[3]/PECP) | 2 | 99.7 | 98.4 | — | 93.2 | 87.9 | 79.7 |

[1]XC is a water soluble polymer including polysaccharides sold under the trade name "Kelzan XC" by Kelco Corp.
[2]Sized shale cuttings (6-10 mesh) are rolled in the test fluid for 15 seconds at 150° F. The shale test solution mixture is then sized over 10, 30 and 80 mesh screens. The amount retained on the screens is added and the percent retained is calculated relative to the original starting material (2.5 gm).
[3]Ethoxylated tallow amine.
[4]Mineral oil.
Oil/Surfactant/Glycerol = Glycerol (93%)/Oil (5.8%)/Surfactant (0.9%) (v/v%).
Oil/Surfactant/PECP = PECP (95%)/Oil (4%)/Surfactant (1.0%) (v/v%).
Oil/Surfactant = 10% oil[4] in water with 1% surfactant (v/v%).
All samples were hot rolled at 150° F. for the indicated amount of time.
All mixtures were by percent by volume.

TABLE 4

Freezing Point Data for Alcohol/Oil[1]/Surfactant[2] Emulsion

| | Core Lab Temperature | |
|---|---|---|
| Formulations | Glycerol (in °F.) | PECP (in °F.) |
| 20% NaCl | 1.0 | 1.0 |
| 20% NaCl/10% Emulsion | −4.0 | −3.0 |
| 20% NaCl/20% Emulsion | −10.0 | −11.0 |
| 20% NaCl/30% Emulsion | −19.0 | −20.0 |
| 20% NaCl/40% Emulsion | −25.0 | −26.0 |
| 20% NaCl/50% Emulsion | −29.0 | −30.0 |
| Fresh Water | 32.0 | 32.0 |
| Fresh Water/10% Emulsion | 29.0 | 28.5 |
| Fresh Water/20% Emulsion | 20.0 | 20.0 |
| Fresh Water/30% Emulsion | 11.5 | 12.0 |
| Fresh Water/40% Emulsion | 0.5 | 0.5 |

TABLE 4-continued

| Freezing Point Data for Alcohol/Oil[1]/Surfactant[2] Emulsion | | |
|---|---|---|
| | Core Lab Temperature | |
| Formulations | Glycerol (in °F.) | PECP (in °F.) |
| Fresh Water/50% Emulsion | −20.0 | −19.0 |

[1]Mineral oil.
[2]Ethoxylated tallow amine.
Freezing point data were determined by the ASTM method 1177.
20% NaCl is 20% salt by weight. This solution was mixed with the oil/alcohol/surfactant emulsion by volume.
Emulsion = 93% alcohol/5.8% oil/0.9% surfactant.

150° F. and 16 hours. The control was bentonite without an additive. Data for the control were obtained only at the 100 inch/pound direct load since a greater load resulted in shearing of the pin. The results suggest that the glycerol/oil/surfactant emulsion has greater lubricating capabilities than glycerol alone. This indicates that this emulsion could be used in drilling operations to reduce torque and drag.

The foregoing description of the invention is merely intended to be explanatory thereof, and various changes in the details of the described method and apparatus may be made within the scope of the appended claims without departing from the spirit of the invention.

What is claimed is:

1. A method for drilling a well, comprising:
rotating a drillstring to cut a borehole into the earth;

TABLE 5

| | Seawater/Bentonite Mud Formulations | | | | | | | | | | | | | |
|---|---|---|---|---|---|---|---|---|---|---|---|---|---|---|
| | PECP | | | | | Glycerol | | | | | | | | |
| Formulations | 1 | 2 | 3 | 4 | 5 | 6 | 7 | 8 | 9 | 10 | 11 | 12 | 13 | 14 |
| Mud Weight (ppg) | 16.0 | 16.0 | 16.0 | 16.0 | 16.0 | 16.0 | 16.0 | 16.0 | 16.0 | 16.0 | 16.0 | 16.0 | 16.0 | 16.0 |
| Seawater (mls) | 245.0 | 221.0 | 196.0 | 172.0 | 147.0 | 245.0 | 221.0 | 196.0 | 172.0 | 147.0 | 221.0 | 196.0 | 172.0 | 147.0 |
| Glycerol (% v/v Sea Water) | | | | | | 0 | 10.0 | 20.0 | 30.0 | 40.0 | | | | |
| Oil /PECP/ Surfactant (% v/v seawater⊕) | 0 | 10.0 | 20.0 | 30.0 | 40.0 | | | | | | | | | |
| Oil / Glycerol/ Surfactant (% v/v Seawater⊕) | | | | | | | | | | | 10.0 | 20.0 | 30.0 | 40.0 |
| Bentonite (gm) | 10.0 | 10.0 | 10.0 | 10.0 | 10.0 | 10.0 | 10.0 | 10.0 | 10.0 | 10.0 | 10.0 | 10.0 | 10.0 | 10.0 |
| Drill Solids (gm) | 35.0 | 35.0 | 35.0 | 35.0 | 35.0 | 35.0 | 35.0 | 35.0 | 35.0 | 35.0 | 35.0 | 35.0 | 35.0 | 35.0 |
| Barite (gm) | 367.0 | 368.0 | 369.0 | 369.0 | 370.0 | 367.0 | 360.0 | 354.0 | 347.0 | 340.0 | 368.0 | 369.0 | 369.0 | 370.0 |
| Chrome Lignosulfonate (gm) | 6.0 | 6.0 | 6.0 | 6.0 | 6.0 | 6.0 | 6.0 | 6.0 | 6.0 | 6.0 | 6.0 | 6.0 | 6.0 | 6.0 |
| Carboxymethylcellulose (gm) | 1.0 | 1.0 | 1.0 | 1.0 | 1.0 | 1.0 | 1.0 | 1.0 | 1.0 | 1.0 | 1.0 | 1.0 | 1.0 | 1.0 |
| Resinx☐ (gm) | 2.0 | 2.0 | 2.0 | 2.0 | 2.0 | 2.0 | 2.0 | 2.0 | 2.0 | 2.0 | 2.0 | 2.0 | 2.0 | 2.0 |
| Hot Rolled 150° F. for 16 hours | | | | | | | | | | | | | | |
| 600 RPM | 69.0 | 72.0 | 76.0 | 85.0 | 92.0 | 70.0 | 72.0 | 70.0 | 67.0 | 72.0 | 73.0 | 75.0 | 77.0 | 82.0 |
| 300 RPM | 40.0 | 42.0 | 43.0 | 47.0 | 51.0 | 41.0 | 41.0 | 41.0 | 37.0 | 41.0 | 43.0 | 43.0 | 45.0 | 47.0 |
| Plastic Viscosity ☐ (cps) | 29.0 | 30.0 | 33.0 | 38.0 | 41.0 | 29.0 | 31.0 | 29.0 | 30.0 | 31.0 | 30.0 | 32.0 | 32.0 | 35.0 |
| Yield Point (lb/100 ft$^2$) | 11.0 | 12.0 | 10.0 | 9.0 | 10.0 | 12.0 | 10.0 | 12.0 | 7.0 | 10.0 | 13.0 | 11.0 | 13.0 | 12.0 |
| 10-Second Gel (lb/100 ft$^2$) | 4.0 | 3.0 | 4.0 | 3.0 | 4.0 | 3.0 | 3.0 | 2.0 | 3.0 | 2.0 | 3.0 | 2.0 | 3.0 | 3.0 |
| 10-Minute Gel (lb/100 ft$^2$) | 15.0 | 14.0 | 12.0 | 14.0 | 16.0 | 14.0 | 15.0 | 9.0 | 5.0 | 6.0 | 12.0 | 10.0 | 12.0 | 13.0 |
| API⊕ Fluid Loss (ml) | 10.0 | 3.5 | 4.0 | 3.0 | 2.5 | 9.0 | 6.0 | 4.5 | 4.0 | 5.0 | 3.5 | 4.6 | 3.5 | 3.5 |
| Cake Thickness (32 inch) | 4.0 | 2.0 | 2.0 | 2.0 | 2.0 | 4.0 | 2.0 | 2.0 | 2.0 | 2.0 | 2.0 | 2.0 | 2.0 | 2.0 |

Mineral oil.
Ethoxylated tallow amine.
⊕Oil/alcohol/surfactant was mixed at a ratio of 5/94/1 percent by volume.
☐ Water soluble, heat stable, synthetically formulated resin used for high temperature fluid loss sold under the trade name Resinex by MI Drilling Fluid Company.
◊Plastic viscosity, yield point and gel strengths were determined with a Fann 35A following the procedures outlined in API RP 13B (Standard Procedures of Field Testing Drilling Fluids).
⊕Test for fluid loss using the API fluid loss test described in Standard Procedures of Field Testing Drilling Fluid (FP 13B). Test for API fluid loss is described in the Standard Procedures of Field Testing Drilling Fluid (RP 13B).

In FIG. 1 frictional coefficients were determined using the Falex Lubricity Tester. Five pounds per barrel of bentonite were mixed in fresh water. The pH was adjusted to 10.0 with NaOH. The suspension was then mixed with either glycerol or glycerol/oil/surfactant emulsion at 10% or 20% by volume and hot rolled at circulating water base drilling fluid through the drill string and through the annulus between the drill string and the wall of the borehole;

checking the drilling fluid or evidence of at least one problem of (a) freezing, (b) gas hydrate formation, (c) shale dispersion, and (d) fluid loss; and adding an oil-in-alcohol emulsion to the drilling fluid in an amount sufficient to substantially prevent said at least one problem from occurring, said alcohol being in a concentration of from about 1 to 60 weight percent based on the total weight of the drilling fluid, and said alcohol being selected from the group consisting of (1) an alcohol having less than 8 hydroxyl groups and less than 16 carbon atoms, (2) an acyclic polyol having 3 to 80 carbon atoms and 2 to 60 hydroxyl groups; (3) a monoalicyclicpolyol having 5 to 30 carbon atoms and 2 to 10 hydroxyl groups; and (4) a cyclicetherpolyol having 6 to 1800 carbon atoms, 2 to 450 hydroxyl groups, and 2 to 600 ether linkages.

2. A method for drilling a well, comprising:

determining whether the formation to be drilled will subject water base drilling fluid to at least one problem of (a) freezing, (b) gas hydrate formation, (c) shale dispersion, and (d) fluid loss;

providing the drilling fluid with an oil-in-alcohol emulsion in an amount sufficient to substantially prevent said at least one problem from occurring;

rotating a drill string to cut a borehole into the earth; and circulating the drilling fluid through the drill string and through the annulus between the drill string and the wall of the borehole, said alcohol being in a concentration of from about 1 to 60 weight percent based on the total weight of the drilling fluid, and said alcohol being selected from the group consisting of (1) an alcohol having less than 8 hydroxyl groups and less than 16 carbon atoms, (2) an acyclic polyol having 3 to 80 carbon atoms and 2 to 60 hydroxyl groups; (3) a monoalicyclicpolyol having 5 to 30 carbon atoms and 2 to 10 hydroxyl groups; and (4) a cyclic-etherpolyol having 6 to 1800 carbon atoms, 2 to 450 hydroxyl groups, and 2 to 600 ether linkages.

3. The method of claim 1 or claim 2 wherein the cyclicetherpolyol is a polycyclicpolyetherpolyol which is characterized by binodal molecular weight distribution, $M_w$ in excess of 50,000, said $M_w$ being determined in a three-column gel permeation chromatography, and being 0.5 to 10% w epoxy structures.

4. The method of claim 3 wherein the polycyclicpolyetherpolyol is further characterized by molecular structures which are no more than 20% free of associated cyclic formations.

5. The method of claim 1 or claim 2 wherein the alcohol has less than 8 hydroxyl groups and less than 16 carbon atoms.

6. The method of claim 1 or claim 2 wherein the alcohol is an acyclic polyol having 3 to 80 carbon atoms and 2 to 60 hydroxyl groups.

7. The method of claim 1 or claim 2 wherein the alcohol is a monoalicyclic polyol having 5 to 30 carbon atoms and 2 to 10 hydroxyl groups.

8. The method of claim 1 or claim 2 wherein the alcohol is a cyclicetherpolyol having 6 to 1800 carbon atoms, 2 to 450 hydroxyl groups, and 12 to 600 ether linkages.

* * * * *